United States Patent Office 3,173,900
Patented Mar. 16, 1965

3,173,900
NITROGEN-SUBSTITUTED ACRYLOXY ACETAMIDES, DERIVATIVES AND POLYMERS THEREOF, AND METHODS OF MAKING THEM
Elinor M. Hankins, Philadelphia, Pa., assignor to Rohm & Haas Company, Philadelphia, Pa., a corporation of Delaware
No Drawing. Filed Sept. 6, 1961, Ser. No. 136,197
20 Claims. (Cl. 260—80.5)

This invention relates to N-hydroxyalkyl-acryloxyacetamides and alkylated derivatives thereof which contain reactive hydroxyl groups rendering the compounds susceptible to both addition polymerization and condensation reactions. Polymers obtained from such compounds and the methods of making the compounds are also part of the invention herein.

The hydroxy-containing compounds of the present invention have the formula

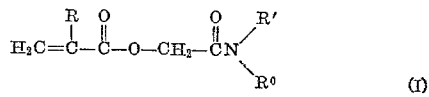

(I)

where

R is selected from the group consisting of hydrogen and methyl,

R' is selected from the group consisting of hydrogen, saturated aliphatic hydroxyl-substituted hydrocarbon radicals having from 1 to 6 carbon atoms and from 1 to 3 hydroxyl groups, and ($C_1$–$C_4$)-alkoxy-substituted hydrocarbon radicals having from 1 to 6 carbon atoms (excluding the carbons of the alkoxy group), preferably being hydrogen or monohydroxyalkyl group having 2 to 4 carbon atoms, and $R^0$ is selected from the group consisting of saturated aliphatic hydroxy-substituted hydrocarbon radicals having from 1 to 6 carbon atoms and 1 to 3 hydroxy groups and ($C_1$–$C_4$)-alkoxy-substituted hydrocarbon radicals having from 1 to 6 carbon atoms (excluding the carbons of the alkoxy groups) preferably being a monohydroxyalkyl group having 1 to 4 carbon atoms.

These compounds may be obtained by the reaction of an acrylate or methacrylate of Formula II with a halogenated compound of Formula III:

$$CH_2=C(R)COOY \qquad (II)$$

where Y is a metal selected from the group consisting of silver and the alkali metals, being preferably, sodium potassium or lithium:

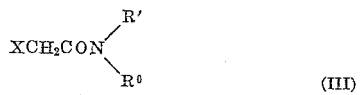

(III)

where R' and $R^0$ are as defined hereinabove and X is selected from the group consisting of chlorine and bromine. The latter compounds are α-halogenoacetamides having one or both hydrogen atoms on the amide nitrogen atom substituted by a hydroxyl-containing and/or alkoxy-containing aliphatic group as defined hereinabove.

In this reaction, equimolar amounts of the compounds of Formulas II and III are generally used. However, an excess of the acrylic acid or methacrylic acid salt of Formula II may be present, if desired. The reaction is effected in an inert solvent, that is one that is inert to the reactants. The reactants may be introduced all at once into the solvent or one may be added after the other all at once or in a gradual manner. As solvents, there may be used acetonitrile, dimethylformamide, dioxane, t-butanol, benzene, dimethyl ether of diethylene glycol, and dimethyl sulfoxide. Of these, acetonitrile is preferred because it provides rapid reaction, it is easily removed after completion of the reaction, and there is little risk of polymerization during reaction. Optionally, there may be added a polymerization inhibitor in an amount of 0.05 to 1% based on the total weight of the reactants. Suitable inhibitors include hydroquinone, the ethers thereof, such as its monomethyl ether, di-β-naphthol, and benzyltrimethylammonium salicylate. While it is not necessary to include the inhibitor, it is generally preferred to do so. Optionally but preferably, a catalyst for the reaction of II and III may be included in an amount of about 0.5 to 3% by weight on the total weight of the reactants. As catalysts, there may be used tertiary amines that quaternize readily, such as trimethylamine, benzyldimethylamine, pyridine or N-methyl pyrrolidine. Instead of tertiary amines, there may be used as catalysts various quaternary ammonium compounds, such as the benzyltrimethylammonium chloride, sulfate, methoxide, acetate, butoxide, salicylate, and so on, a corresponding tetramethylammonium chloride, sulfate, and so on, also choline, choline methoxide, as well as others. The use of benzyltrimethylammonium salicylate serves to provide both a catalytic function and polymerization-inhibiting function.

Compounds of Formula III are generally obtained (except for those containing methylol and alkoxymethyl groups) by the reaction of a compound of Formula IV with a compound of Formula V:

$$HNR'R^0 \qquad (IV)$$

$$XCH_2COOR'' \qquad (V)$$

where R'' is an alkyl group having 1 to 18 carbon atoms and is preferably methyl and R', $R^0$, and X are as defined hereinabove.

In this reaction of Compounds IV and V, about equimolar proportions of the two reactants may be used although an excess of one or the other may be present. The reaction may be carried out in a solvent, such as methanol, at a temperature between about −10° to +10° C., preferably from 0° to −8° C. To assist in the maintenance of the temperature, it is preferred to add one of the reactants to the other, preferably a solution of the other, such solutions being in methanol or other solvents inert to the reactants. Suitable cooling means may be provided about the reaction vessel. The reaction may take from a half to seven hours or more, depending on the cooling capacity available and the amount of the reactants to be reacted. The product of Formula III may be isolated in many cases merely by stripping off the solvent. When the product precipitates, generally as a white solid, it may be isolated by filtration. Additional product may sometimes be obtained by further crystallization effected by cooling the filtrate and refiltering. Purification may be effected such as by washing with methanol, acetone, or the like. The product of Formula III may then be dried before introducing it into the reaction with a compound of Formula II above.

Examples of compounds of Formula IV include 2-hydroxyethylamine, 3-hydroxypropylamine, 3-methoxy propylamine, 1-(hydroxymethyl)-propylamine, di-(2-hydroxyethyl)amine, 1,1 - (di-hydroxymethyl)-ethylamine, tris-(hydroxymethyl)methylamine, 2,2 - (dihydroxymethyl)-propylamine, di-(2-methoxyethyl)amine, di-(2-hydroxypropyl)amine, di-(2-butoxyethyl)amine, di-(2-ethoxyethyl)amine, 3-tert-butoxypropylamine, 3-(isopropoxy)propylamine.

Compounds of Formula V include alkyl α-monochloroacetates and α-monobromoacetates, e.g. the methyl, ethyl, etc. ester, especially the methyl ester.

The compounds of Formula III containing methylol groups may be obtained by reacting α-chloroacetamide or α-bromoacetamide with formaldehyde under alkaline conditions at temperatures of 50 to 80° C. The alkoxymethyl derivatives are obtained therefrom by adding the appropriate ($C_1$-$C_4$)-alcohol, acidifying the methylol derivatives and heating to reflux.

The compounds of Formula I are either high-boiling liquids or solid crystalline materials generally white or colorless when pure, and they are generally soluble in alcohols, especially methanol, ethanol, and isopropanol, in dimethylformamide, ethyl acetate, acetonitrile, dimethylacetamide, and acetone. Some are soluble in water.

Compounds of Formula I are useful as plasticizers, particularly with nylons of the polyamide type including that known as the 66 nylon, and also for vinyl resins, such as copolymers of vinyl chloride with vinyl acetate. The compounds of Formula I may be introduced into all sorts of formed structures, such as fibers, films, sheets, rods and other shaped structures, formed of various vinyl resins, such as copolymers of vinyl chloride with acrylonitrile or vinyl acetate, homopolymers of vinyl chloride, vinylidene chloride, or acrylonitrile, copolymers of vinylidene chloride with acrylonitrile or vinyl acetate or vinyl chloride, copolymers of acrylonitrile with vinyl acetate, vinyl pyridines, ethylene, isobutylene, and so on, by introducing from 2% to 10% by weight, on the weight of the film-forming polymer, of one or more of the compounds of Formula I in the melt, solution, or dispersion of the latter before its extrusion, casting, or molding into the final shaped product. The incorporation of the compounds of Formula I in this manner into formed vinyl resin structures serves various purposes including modification of the dyeing, which is particularly important in the production of fibrous materials from polymers of acrylonitrile containing 75% to 95% of the acrylonitrile with other comonomers. Another important purpose served by the introduction of the new compounds into various formed articles made from vinyl resins and especially the polymers of acrylonitrile just mentioned is the increase in moisture retention or moisture regain of the structures and also the reduction of the tendency to develop static electricity during spinning operations as in carding, drawing and twisting, weaving and knitting, and so on. The compounds of Formula I may also be included with glycerine or glycols to provide softening compositions for products, and especially pellicles, films, or sheets formed of regenerated cellulose and hydroxyethyl cellulose to enhance the slip characteristics of the sheets and to reduce blocking tendencies thereof.

The compounds of Formula I are also useful as modifiers in aminoplast resin-forming condensates generally, especially those of urea-formaldehyde and melamine-formaldehyde. In such case, a small amount of a free radical initiator of the types described hereinafter may be included to provide addition polymerization before, during, or after the thermosetting condensation reaction. In this connection, the new compounds may take part in the thermosetting reaction by virtue of the reactivity of the hydrogen on the nitrogen with formaldehyde or with formaldehyde in conjunction with a lower alcohol from methyl through butyl that may be present in the aminoplast composition or by virtue of the similar reactivity of methylol groups or alkoxymethyl groups already present, or by virtue of the reactivity of the hydroxyl groups present in groups R′ and R⁰.

As a chemical intermediate, the compounds of the present invention are adapted to react at the double bond with various compounds including alcohols, mercaptans, primary or secondary amines, nitroalkanes, malonates, acetoacetates, sodium bisulfite, and so on. The addition of long chain amines or mercaptans, such as dodecylamine or mercaptan, provides compounds which are highly useful as water-proofing, softening and lubricating agents for textiles of all types and especially of cellulosic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although the compounds of Formula I have generally an appreciable solubility in water, these compounds may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis(α,γ - dimethylvaleronitrile), azobis(α - methylbutyronitrile), azobis(α - methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds containing a single $H_2C=C<$ group that may be copolymerized with the compound of Formula I include vinylpyridines, such as 2-vinylpyridines and 4-vinylpyridines, acrylonitrile methacrylonitrile, acrylic and methacrylic acids (which may be generically represented by the formula

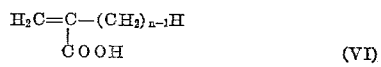

in which $n$ is an integer having a value of 1 to 2), their esters (especially those with a saturated aliphatic alcohol having 1 to 18 carbon atoms), amides and salts, itaconic acid and its functional derivatives, particularly its esters, maleic anhydride or maleic and fumaric acids and their esters, vinyl ethers and esters, vinyl sulfides, styrene, vinyl toluene, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical-polymerizable vinylidene groups occur, as in divinylbenzene trivinylbenzene, ethylene diacrylate or methacrylate, bis(vinyloxyethyl)urea, or vinyloxyethyl acrylate or methacrylate, insoluble interpolymers result.

The homopolymers of compounds of Formula I (except for the larger alkoxy substituted types, e.g. N-butoxypropyl) are generally water-soluble. They are useful as sizes for paper, textiles and particularly as warp sizes. When introduced into paper pulps, they provide increased wet strength in the final dry paper containing them. For this purpose, there may be used from about 1% to 7% of a polymer of one of the compounds of Formula I on the dry fiber weight of the paper. They are useful as thickeners for various aqueous coating, adhesive, and film-forming compositions. The homopolymers are also useful as flocculants, especially useful in higher molecular weights of at least 20,000 to 50,000 to aid in the clarification of aqueous systems containing clays, or other finely divided materials, especially mineral matter as is produced in the grinding of ores. In this connection, they not only increase the settling rate but generally increase the rate of filtration. The homopolymers may be used in admixture with other materials, such as starch, gelatin, or plasticizers therefor to provide coatings or films, thickening materials, warp sizes or the like. The homopolymers with other film-forming materials, such as vinyl and acrylic resins, may be pigmented or dyed to provide decorative coatings on substrates, such as textile, leather, paper, wood or on metal or glass surfaces. The homopolymers are reactive with formaldehyde and the reaction product thereby obtained is also useful as an additive to paper pulps to provide increased wet strength in the final paper. The homopolymers, or their reaction product with formaldehyde, may be combined with aminoplast resin-forming condensation products, such as those of urea-formaldehyde or triazine formaldehyde condensates including melamine-formaldehyde. The inclusion of the homopolymers of the present invention serves to increase the toughness of the product and the water-resistance thereof when used in amounts of about 5% to 15%, based on the weight of the aminoplast condensate.

Copolymers containing a large proportion of one or more of the compounds of Formula I have similar utilities to the extent that they are water-soluble as warp sizes, wet strength resins in paper, thickeners, and flocculants. However, copolymers containing from 0.5% to 20% by weight or more of the compounds of Formula I with various comonomers are adapted to provide valuable coating materials, especially for metals, which may be pigmented or not and in the case of emulsion copolymers, they are adapted to provide valuable water-base paints. Copolymers containing from 5% to 20% by weight of a compound of Formula I with ethyl acrylate, butyl acrylate, or the like, are useful to reduce the shrinkage of wool or to bond non-woven fabrics for which purpose, if desired, the copolymer may be used with about 1 to 10% by weight, on the copolymer, of an aminoplast condensate such as a condensate of formaldehyde with urea, N,N'-ethylene urea, melamine, and 5-($C_1$-$C_4$ alkyl) or 5-hydroxyethyl-substituted tetrahydro-5-triazones-2. For these purposes, they may be applied in aqueous dispersions of a concentration from 10% to 30% so that from about 5% to 15% by weight of the copolymer is deposited on the wool fabric. After drying, the treated fabric may be heated to 240° F. to 350° F. from a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. In this connection, the hydroxyalkyl groups apparently exert some chemical bonding action with the structure of the leather so as to provide good adhesion. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate or the like, serve to modify the dyeing properties of fibers and films formed therefrom.

In the following examples, which are illustrative of the present invention, parts are by weight and temperatures are ° C. unless otherwise noted:

EXAMPLE 1

(a) *N-(3-hydroxypropyl)-α-chloroacetamide*

A solution of 75 g. (1 mole) of distilled 3-aminopropanol in 100 ml. of methanol was added at 0–5° with stirring over 7⅔ hours to a solution of 119.4 g. (1.1 mole) of methyl chloroacetate in 200 ml. of methanol. After overnight storage in the refrigerator methanol and excess methyl chloroacetate were stripped off at room temperature first on the water pump and then at 0.5 mm. pressure. There was obtained 152.1 g. (100%) of colorless viscous liquid which crystallized in the refrigerator, M.P. 23.1–24.6°.

*Analysis.*—Calcd. for $C_5H_{10}NO_2Cl$: N, 9.24; Cl, 23.39. Found: N, 9.1; Cl, 23.3.

(b) *N-(3-hydroxypropyl)-α-methacryloxyacetamide*

A mixture of 151.6 g. (1 mole) of N-(3-hydroxypropyl)-α-chloroacetamide, 216.0 g. (2 moles) of sodium methacrylate, and 1200 ml. of acetonitrile was refluxed with stirring for 13 hours with 4.0 g. benzyltrimethylammonium salicylate catalyst and for 18 hrs. more with an additional 2 g. catalyst. Filtration and washing with acetonitrile left 204.7 g. of solid; the theoretical amount of sodium chloride and excess sodium methacrylate was 166.5 g. The combined filtrates and washings were stripped at 30–40° at reduced pressure after addition of hydroquinone to give 175.3 g. (87.5%) of tan crystalline solid. Recrystallization from ethyl acetate yielded 99.6 g. (49.6%) of almost white crystalline solid, M.P. 70–75°.

In a second recrystallization there was obtained 80 g. (39.8%) of white crystalline solid, M.P. 72.5–74°.

*Analysis.*—Calcd. for $C_9H_{15}NO_4$: N, 6.96; C, 53.72; H, 7.51. Found: N, 6.9; Cl, 0.09.

EXAMPLE 2

(a) N-(3-methoxypropyl)-α-chloroacetamide

A similar procedure was followed with addition of 356.6 g. (4 moles) of 3-methoxypropylamine in 200 g. of methanol to 455.7 g. (4.2 moles) of methyl chloroacetate in 200 g. of methanol. The crude product was 638.2 g. (96.4%) of red brown liquid. Distillation yielded 419.8 g. (63.4%) of colorless liquid, boiling range 106.5°/1.4 mm.–113°/1.3 mm., $n^{26}D$ 1.4709, and 60.3 g. (9.1%) of colorless liquid, B.P. 113°/1.3 mm.→118°/1.8 mm., $n^{26}D$ 1.4716.

*Analysis.*—Calcd. for $C_6H_{12}NO_2Cl$: N, 8.46; Cl, 21.41; $OCH_3$, 18.74. Found: Main fraction: N, 8.4; Cl, 21.5; $OCH_3$, 19.3; Second Fraction: N, 8.4; Cl, 21.4; $OCH_3$, 18.7.

(b) N-(3-methoxypropyl)-α-methacryloxyacetamide

A mixture of 82.8 g. (0.5 mole) N-(3-methoxypropyl)-α-chloroacetamide, 85.3 g. (0.75 mole) of sodium methacrylate, 400 g. of distilled acetonitrile, and 1.66 g. of benzyltrimethylammonium salicylate was refluxed with stirring for 19 hours. Filtration removed 72.3 g. (129%) of white solid. The filtrate was stripped at 0.5 mm. pressure and room temperature to constant weight to give 97.6 g. (90.7%) of gray viscous liquid which gradually solidified. The crude product was recrystallized from ethyl acetate at 64% solids. A Dry Ice-acetone bath was necessary to precipitate the product. There was obtained 53.4 grams (49.6%) of white crystalline low melting solid.

*Analysis.*—Calcd. for $C_{10}H_{17}NO_4$: N, 6.51; Cl, nil. Found: N, 6.1; Cl, 0.3.

EXAMPLE 3

(a) N-[1-(hydroxymethy)propyl]-α-chloroacetamide

A solution of 178 g. (2.0 moles) of 2-aminobutanol in 100 g. of methanol was added slowly in 5½ hours to a solution of 239 g. (2.2 moles) of methyl chloroacetate in 100 g. of methanol at −7 to −5°. After overnight refrigeration, the reaction mixture was stripped to 350 g. (>100%) of light tan crystals. Recrystallization from 300 ml. of acetonitrile gave 72 g. (21.8%) of N-[1-(hydroxymethyl)propyl]-α-chloroacetamide as a white crystalline solid, M.P. 74.5–75.5°.

*Analysis.*—Calcd. for $C_6H_{12}NO_2Cl$: N, 8.46; Cl, 21.41. Found: N, 8.4; Cl, 21.2.

(b) N-[1-(hydroxymethyl)propyl]-α-methacryloxyacetamide

A mixture of 16.6 g. (0.1 mole) of N-[1-(hydroxymethyl)propyl]-α-chloroacetamide, 15.0 g. (0.12 mole) of potassium methacrylate, 0.32 g. of benzyltrimethylammonium salicylate, and 150 g. of acetonitrile was refluxed with stirring for 15 hours. Filtration removed 11 g. (110%) of insoluble material. Acetonitrile solvent was removed from the filtrate to give 21.5 g. (107%) of yellow viscous liquid, which partially solidified on standing in the refrigerator.

*Analysis.*—Calcd. for $C_{10}H_{17}NO_4$: N, 6.51. Found: N, 6.9; Cl, 2.0.

(c) Part (b) was repeated using potassium acrylate in place of the methacrylate, thereby producing N-[1-(hydroxymethyl)-propyl]-α-acryloxyacetamide.

EXAMPLE 4

(a) N,N-bis-(β-hydroxyethyl)-α-chloroacetamide

A solution containing 119.35 g. (1.1 moles) methyl chloroacetate in 100 ml. of methanol was cooled to 2.5°. To this was added 105 g. (1 mole) of diethanolamine in 160 ml. of methanol over a period of seven hours during which the reaction mixture was maintained by cooling at 0–5°. After storage overnight in the refrigerator, the resulting colorless solution was stripped to constant weight, first at water pump pressure and then at 0.5 mm. There was obtained 183.6 g. (100%) of a colorless viscous liquid.

*Analysis.*—Calcd. for $C_6H_{12}NO_3Cl$: N, 7.71; Cl, 19.52. Found: N, 7.7; Cl, 18.8.

(b) N,N-di-(β-hydroxyethyl)-α-methacryloxyacetamide

A mixture of 45.4 g. (0.25 mole) of N,N-bis(β-hydroxyethyl)-α-chloroacetamide, 55.3 g. (0.5 mole) of sodium methacrylate, 350 ml. of acetonitrile, and 2 g. of benzyltrimethylammonium salicylate was heated at reflux for 16 hours. An additional 2 g. of catalyst was added and the mixture was refluxed four hours longer. Suction filtration removed 48.8 g. of white solid. The filtrate was stripped to constant weight by heating under a vacuum to give 59.1 g. (>100%) of a light brown, very viscous liquid.

*Analysis.*—Calcd. for $CH_{10}N_{17}NO_5$: N, 6.06. Found: N, 6.0; Cl, 0.46.

EXAMPLE 5

(a) N-[1,1-bis(hydroxymethyl)ethyl]-α-chloroacetamide

To a solution of 240 g. (2.2 moles) of methyl chloroacetate in 600 g. of methanol was added 210 grams (2.0 moles) of 2-amino-2-methyl-1,3-propanediol in portions over 5½ hours. The temperature was kept at −5 to −6° during the addition. The resultant clear, colorless solution, after overnight refrigeration, was stripped at reduced pressure to constant weight. There was obtained 350 grams (96.6%) of white crystalline solid. Recrystallization from 300 ml. of acetone gave 290 g. (80%) of N-[1,1-bis(hydroxymethyl)ethyl]-α-chloroacetamide as a white crystalline solid, M.P. 100–101° C.

*Analysis.*—Calcd. for $C_6H_{12}NO_3Cl$: N, 7.71; Cl, 19.52. Found: N, 7.7; Cl, 19.6.

(a) N-[1,1-bis(hydroxymethyl)ethyl]-α-methacryloxyacetamide

A mixture of 42.9 g. (0.24 mole) of N-[1,1-bis(hydroxymethyl)ethyl]-α-chloroacetamide, 44.7 g. (0.36 mole) of potassium methacrylate, 200 g. of acetonitrile, and 0.85 g. of benzyltrimethylammonium salicylate was refluxed for 16 hours. The mixture was filtered to remove 30.4 g. (92.8%) of almost white solid. High vacuum stripping of the filtrate gave 59.4 g. (>100%) of tan viscous liquid.

*Analysis.*—Calcd. for: $C_{10}H_{17}NO_5$: N, 6.06. Found: N, 6.3; Cl. 0.5; ash, 3.0.

EXAMPLE 6

(a) N-[tris-(hydroxymethyl)methyl]α-chloroacetamide

A solution of 238.7 g. (2.2 moles) of methyl chloroacetate in 150 ml. of methanol was cooled to 0°, and 242 g. (2 moles) of tris-(hydroxymethyl)methylamine and 350 ml. of methanol were added in one hour at 0–2°. The mixture was stirred and allowed to reach room temperature and kept at room temperature for six hours. The resulting clear solution was stripped to 668.2 grams and cooled to precipitate a product. Filtration gave 289.5 grams (73.3%) of white crystalline solid, M.P. 92–95°. Recrystallization of the crude product from methanol at 73% solids yielded 225.8 grams (58.0%) of N-[tris-(hydroxymethyl)methyl]-α-chloroacetamide, M.P. 92–93.5°.

*Analysis.*—Calcd. for $CH_6N_{12}O_4Cl$: N, 7.09; Cl, 17.94. Found for crude product: N, 7.0; Cl, 17.8; found for recrystallized product: N, 7.1; Cl, 17.9.

(b) N-[tris(hydroxymethyl)methyl]-α-methacryloxyacetamide

A mixture of 98.8 g. (0.5 mole) of tris(hydroxymethyl)-methyl-α-chloroacetamide, 85.2 g. (0.75 mole) of sodium methacrylate, 400 g. of acetonitrile, and 3.95 g. of benzyltrimethylammonium salicylate was stirred at reflux temperature for 16 hours. An additional 1.976 g. of catalyst was added and the mixture was refluxed four hours longer. Filtration removed 67.2 g. (119%) of white solid. The filtrate was stripped to constant weight at high vacuum. There was obtained 112.6 g. (91.1%) of light yellow, very viscous liquid. This gelled in the refrigerator.

*Analysis.*—Calcd. for $C_{10}H_{17}NO_6$: N, 5.67. Found: N, 6.6; Cl, 1.1.

EXAMPLE 7

(a) N-(3-isopropoxypropyl)-α-chloroacetamide is prepared by the process of Example 2(a) replacing the 3-methoxypropylamine with 4 moles of 3-isopropoxypropylamine.

(b) *N-(3-isopropoxypropyl)-α-methacryloxyacetamide*

Forty-eight and four-tenths grams (48.4 g., 0.25 mole) of N-(3-isopropoxypropyl)-α-chloroacetamide, 56.6 grams (0.5 mole) of potassium methacrylate, 200 g. of distilled acetonitrile, and 0.978 gram of benzyltrimethylammonium salicylate were mixed and heated at reflux for 17 hours. Suction filtration removed 51.1 grams (123%) of white solid. Removal of acetonitrile from the filtrate at high vacuum gave 59.2 g. (97.8%) of light yellow viscous liquid. The crude product (45.9 g.) was distilled under vacuum after addition of a small amount of polymerization inhibitor. N-(3-isopropoxypropyl)-α-methacryloxyacetamide was obtained in 57.6% yield as an almost colorless liquid, boiling at 147–152° at 0.9–1.0 mm. pressure.

*Analysis.*—Calcd. for $C_{12}H_{21}NO_4$: N, 5.76; Cl, nil. Found for crude product: N, 6.3; Cl. 0.3; found for distillate: N, 5.8; Cl, 0.41.

EXAMPLE 8

(a) *N-[1,1-bis(hydroxymethyl) propyl]-α-chloroacetamide*

To a solution of 227.8 g. (2.1 moles) of methyl chloroacetate in 140 g. of methanol was added 238 g. (2 moles) of 2-amino-2-ethyl-1,3-propane-diol in 140 g. of methanol during 4¾ hours at −5 to +2°. After 64 hours in the refrigerator, the reaction mixture was still basic. It was stirred at room temperature for eight hours and then refrigerated an additional 64 hours. The resulting solution was stripped by heating under vacuum to constant weight to give 393.4 g. (100%) of sticky, light yellow crystals. Two recrystallizations from acetonitrile gave 148.5 g. (38%) of N-[1,1-bis(hydroxymethyl) propyl]-α-chloroacetamide as a white crystalline solid, M.P. 60–61°.

*Analysis.*—Calcd. for $C_7H_{14}NO_3Cl$: N, 7.16; Cl. 18.12. Found: N, 7.1; Cl, 17.8.

(b) Then N-[1,1-bis(hydroxymethyl) propyl]-α-methacryloxyacetamide was prepared by the process of Example 5(b) using the substituted α-chloroacetamide of part (α) hereof.

EXAMPLE 9

*N-(hydroxymethyl)-α-methacryloxyacetamide*

A mixture of 30.9 g. (0.25 mole) of N-methylol-α-chloroacetamide 56.9 g. (0.5 mole) of sodium methacrylate, 1.235 g. of benzyltrimethylammonium salicylate, and 300 g. of distilled acetonitrile was heated at reflux temperature with stirring for 22 hours. Filtration removed 50.8 g. (118%) of insoluble material. Acetonitrile was removed from the filtrate at reduced pressure to 99.5 g. The resulting solution was cooled and filtered to give 5.9 g. (13.6%) of white crystals, M.P. 111–112.5°.

*Analysis.*—Calcd. for $C_7H_{11}NO_4$: N, 8.09, $CH_2O$, 17.34. Found: N, 8.1; Cl, nil.

EXAMPLE 10

*N-(methoxymethyl)-α-methacryloxyacetamide*

A mixture of 100 g. (0.727 mole) of N-methoxymethyl-α-chloroacetamide, 124.9 g. (1.1 moles) of sodium methacrylate, 400 g. of distilled acetonitrile, and 2 g. of benzyltrimethylammonium salicylate was stirred and heated at reflux temperature for sixteen hours. The reaction mixture was filtered to remove 113.7 g. of white solid (theoretical amount=82.9 g.).

The filtrate and washings were combined and stripped at 0.5 mm. and room temperature, yielding 55.5 g. (40.7%) of almost white solid, melting at 52–55°.

*Analysis.*—Calcd. for $C_8H_{13}NO_4$: H, 7.48; Cl, nil; total $CH_2O$, 16.04; $OCH_3$, 16.58. Found: N, 7.5; Cl, 1.0.

EXAMPLE 11

(a) The process of Example 2(a) was repeated using 3-(tert-butoxy) propylamine (4 moles).

(b) Example 7(b) was repeated using the substituted chloroacetamide obtained in part (a) thereof, thereby producing N - [3-(tert-butoxy)propyl]-α-methacryloxyacetamide.

EXAMPLE 12

Each of the several N-substituted acryloxy- or methacryloxy-acetamide products of preceding examples was homopolymerized by dissolving the respective monomeric product at about 33% concentration in dimethylformamide using 1%, on the weight of monomer, of dimethyl azodiisobutyrate and various amounts up to 1% on the weight of monomer, of mercaptoethanol. Polymerization was effected at 65° C. for 16 hours. The polymers were isolated from the resulting solutions (having the viscosities indicated in Table I) by adding a precipitant indicated in the table and then purified by redissolving in the solvent mentioned in the table (DMF being used to represent dimethylformamide).

TABLE I

| Run No. | Monomer of Example | Amount of mercaptoethanol (percent) | Viscosity Stokes | Precipitant | Solvent |
|---|---|---|---|---|---|
| a | 1(b) | 1 | 3.7 | Acetone | DMF. |
| b | 2(b) | 0.5 | 6.1 | Water | Acetone. |
| c | 9 | 1 | 10.1 | ____do____ | Do. |
| d | 10 | 1 | 1.0 | Petroleum ether. | Do. |
| e | 10 | 0.3 | 6.1 | Water | Do. |
| f | 11(b) | 0.3 | 0.9 | ____do____ | Methanol. |

EXAMPLE 13

(a) A copolymer is prepared in 639 parts water containing 90 parts of t-octylphenoxypolyethoxyethanol containing about 40 oxyethylene units as emulsifier from a mixture of 1220 parts ethylacrylate, 590 parts methyl methacrylate, 18 parts methacrylic acid, and 18 parts N-(3 - hydroxypropyl)-α-methacryloxyacetamide using an ammonium persulfate catalyst. The pH of the emulsion was adjusted to a pH of 9.5 with ammonium hydroxide. It contained 46% solids.

(b) Wood panels of white pine were coated with the 46% solids emulsion copolymer dispersion of part (a) by brushing the dispersion on the panels.

(c) Other panels of white pine panels had brushed on their surfaces a pigmented primer formed of the copolymer dispersion of part (a) and having the following formulation:

| | |
|---|---|
| Water _____parts__ | 39.0 |
| Ammonium salt of maleic anhydride/diisobutylene copolymer _____parts__ | 0.4 |
| Rutile titanium dioxide _____do____ | 28.3 |
| Water ground mica _____do____ | 71.7 |
| Hydroxyethyl cellulose (2%) _____do____ | 71.7 |
| Ethylene glycol _____do____ | 1.4 |
| Copolymer dispersion of part (a) (46% solids) _____parts__ | 723.0 |
| Preservative _____do____ | 2.8 |
| Anti-foamer _____do____ | 2.8 |
| Total solids _____percent__ | 45.7 |
| Pigment volume content _____do____ | 10.0 |
| pH | 9.0 |
| Viscosity _____Krebs units__ | 58 |

(d) The dried primed panels obtained in parts (b) and (c) were then coated with two coats of a water-base acrylic polymer exterior paint. The same water-base acrylic emulsion exterior paint was applied in two coats over unprimed white pine panels.

(e) The clear emulsion polymer of part (a) and the pigmented emulsion polymer formulation of part (c) were applied to sanded panels or various woods including yellow pine, oak, maple, cypress and Douglass fir. They were also applied to surfaces of such woods as were just named which had previously been painted with an oil-base paint which had partially been removed by weathering. The application to the latter panels was made after sanding off the loose portions of the old paint layers. The coatings adhered well, exhibited little or no stain, were free of blisters, and showed no evidence of cracking. Similar results were obtained when the coated panels were given two or three coats of the same polymer compositions and also when the panels carrying a single coat of the clear and pigmented compositions just mentioned were further coated with one and two additional coats of a commercially available acrylic emulsion polymer water-base paint.

EXAMPLE 14

An aqueous dispersion containing 15% of an emulsion copolymer of a mixture of 5% by weight of the product of Example 9 with 95% by weight of n-butyl acrylate is applied to a wool fabric by padding, dried 10 minutes at 240° F. and cured at 300° F. for 10 minutes. The fabric shows reduced shrinkage on laundering without an appreciable change of hand.

EXAMPLE 15

A mixture of 273 grams of methyl methacrylate, 166.5 grams of butyl methacrylate, 25.4 grams of N-(3-hydroxypropyl)-α-methacryloxyacetamide and 500 grams of ethoxyethyl acetate is heated in a glass vessel provided with a nitrogen atmosphere to 70° to 75° C. Then 4 grams of azodiisobutyronitrile is added while agitating. After the third and fifth hours at 75° to 80° C., solutions of 2 grams of the azodiisobutyronitrile in 50 grams of ethoxyethyl acetate are added. Three hours later, the reaction mixture is filtered giving a solution of the ternary copolymer having 42.2% solids.

EXAMPLE 16

A mixture of 352 grams of methyl methacrylate, 20.7 grams of acrylonitrile, and 25.4 grams of N-(methoxymethyl)-α-methacryloxyacetamide is copolymerized in 500 grams of ethoxyethyl acetate as in Example 13 using the same initiator in the same proportions.

EXAMPLE 17

To the several solutions of the ternary copolymers of Examples 15 and 16 and to the dispersion of the binary copolymer of Example 14, there is added 1% of oxalic acid and 20% of bis-(methoxymethyl)urea (based on copolymer weight) and then each of the resulting solutions is cast as a film on a glass panel and baked at 300° F. for 30 minutes. Clear, hard, glossy coatings which are alkaki-resistant and resist dissolution by ethoxyethyl acetate are obtained. The coatings may be pigmented and/or plasticized, such as by dibutyl phthalate, and applied directly on metal surfaces or over primers thereon to produce colored or white coatings of good hardness and toughness.

EXAMPLE 18

(a) To a solution of 2.55 grams (0.01 mole) of N-(3-methoxypropyl)-α-methacryloxyacetamide in 7.65 grams of 2-methoxy-ethanol are added 22.44 grams (0.2244 mole) of methyl methacrylate, 17.56 grams (0.1756 mole) of ethyl acrylate, 43.2 grams of toluene and 0.084 gram of benzoyl peroxide. The resulting solution is heated under nitrogen for one hour at a bath temperature of 115° C. and then for twenty-three hours at a bath temperature of 125° C. The resulting clear colorless solution (92.3 grams) has 44.5% solids. The solution forms coatings having good gloss, clarity and adhesion on panels of various metals, wood, glass, porcelain and on metals primed with a mixture of an alkyd with a butylated methylol melamine resin.

(b) By a procedure similar to that of part (a), an excellent coating solution is obtained containing a copolymer of 0.2 mole percent of N-[1-(hydroxymethyl)propyl]-α-methacryloxyacetamide, 0.5 mole percent of methacrylic acid, and 99.3 mole percent of methyl methacrylate.

EXAMPLE 19

A mixture of 352 grams of methyl methacrylate, 20.7 grams of acrylonitrile, and 25.4 grams of N,N-di(β-hydroxyethyl)-α-methacryloxyacetamide is copolymerized in 500 grams of ethoxyethyl acetate as in Example 15 using the same initiator in the same proportions. Panels of glass and cold-rolled steel were coated with the resulting solution as in Example 17 with comparable results.

EXAMPLE 20

(a) An aqueous dispersion of a copolymer was obtained by the emulsion copolymerization at 60° C. of 45 parts of vinyl-toluene, 202.5 parts of ethyl acrylate, 45 parts of methyl methacrylate, and 7.5 parts of N-[1-(hydroxymethyl)propyl]-α-acryloxyacetamide in 350 parts of water in the presence of 1.5 parts of ammonium persulfate and 1.5 parts sodium hydrosulfite, and 9 parts of an ethylene oxide condensate of a t-octylphenol containing about 40 oxyethylene units per molecule. A reaction temperature of 60° C. was maintained for 3 to 4 hours. The pH of the polymeric dispersions was adjusted to 8.5 with ammonium hydroxide.

(b) There are mixed and ground in a pebble mill 190 parts of titanium dioxide and 190 parts of zinc oxide in 189.5 parts of water containing 7.2 parts of diethylene glycol and as dispersing agents 3.8 parts of the sodium salt of a maleic anhydride/diisobutylene copolymer having a number average molecular weight of 3000 and 1.9 parts of an octylphenoxypolyethoxyethanol containing an average of about 11 oxyethylene units. When this mixture has been ground to a smooth, uniform paste, it is mixed with 516.0 parts of a dispersion of the interpolymer, which contains 46% solids, prepared by the procedure of part (a) hereof. The resulting composition is an excellent water-base paint for exterior surfaces, such as masonry of all types and it is also useful as an exterior topcoat over wood surfaces, especially when the latter is primed with an alkyd resin paint.

It is to be understood that changes and variations may be made without departing from the spirit and scope of the invention as defined in the appended claims.

I claim:

1. A compound of the formula

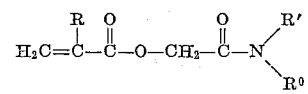

where

R is selected from the group consisting of H and methyl,

R′ is selected from the group consisting of hydrogen, saturated aliphatic hydroxyl-substituted hydrocarbon groups having from 1 to 6 carbon atoms and from 1 to 3 hydroxyl groups, and ($C_1$–$C_4$)-alkoxy substituted hydrocarbon groups having from 1 to 6 carbon atoms excluding the alkoxy group carbon atoms, and, $R^0$ is selected from the group consisting of saturated aliphatic hydroxyl-substituted hydrocarbon groups having 1 to 6 carbon atoms and 1 to 3 hydroxyl groups and ($C_1$–$C_4$)-alkoxy-substituted hydrocarbon groups having from 1 to 6 carbon atoms excluding the alkoxy group carbon atoms.

2. A polymer of a compound as defined in claim 1.

3. A copolymer of a compound as defined in claim 1 with at least one other ethylenically unsaturated compound having at least one $H_2C{=}C{<}$ group.

4. A copolymer of a compound as defined in claim 1 with at least one other monoethylenically unsaturated compound having an $H_2C{=}C{<}$ group.

5. A copolymer of a compound as defined in claim 1 with at least one ester of an acid of the formula

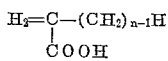

in which $n$ is an integer having a value of 1 to 2, with a saturated aliphatic alcohol having 1 to 18 carbon atoms.

6. A copolymer of a compound as defined in claim 1 with acrylonitrile.

7. A copolymer of a compound as defined in claim 1 with acrylonitrile and at least one ester of an acid of the formula

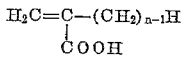

in which $n$ is an integer having a value of 1 to 2, with a saturated aliphatic alcohol having 1 to 18 carbon atoms.

8. N-(hydroxymethyl)-α-methacryloxyacetamide.

9. A copolymer of N-(hydroxymethyl)-α-methacryloxyacetamide with at least one other monoethylenically unsaturated compound having an $H_2C{=}C{<}$ group.

10. N-(3-hydroxypropyl)-α-methacryloxyacetamide.

11. A copolymer of N-(3-hydroxypropyl)-α-methacryloxyacetamide with at least one other monoethylenically unsaturated compound having an $H_2C{=}C{<}$ group.

12. N-(methoxymethyl)-α-methacryloxyacetamide.

13. A copolymer of N-(methoxymethyl)-α-methacryloxyacetamide with at least one other monoethylenically unsaturated compound having an $H_2C{=}C{<}$ group.

14. N-[1-(hydroxymethyl)propyl] - α - methacryloxyacetamide.

15. A copolymer of N-[1-(hydroxymethyl)propyl]-α-methacryloxyacetamide with at least one other monoethylenically unsaturated compound having an $H_2C{=}C{<}$ group.

16. N,N-di(β-hydroxyethyl)-α-methacryloxyacetamide.

17. A copolymer of N,N-di(β-hydroxyethyl)-α-methacryloxyacetamide with at least one other monoethylenically unsaturated compound having an $H_2C{=}C{<}$ group.

18. A method of producing a compound as defined in claim 1 which comprises reacting, in an inert solvent, a compound of the formula $CH_2{=}C(R)COOY$ with a compound of the formula

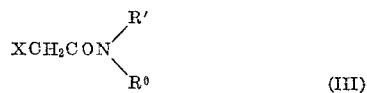

where
R is selected from the group consisting of hydrogen and methyl,
R' is selected from the group consisting of hydrogen, saturated aliphatic hydroxyl-substituted hydrocarbon groups having from 1 to 6 carbon atoms and from 1 to 3 hydroxyl groups, and ($C_1$–$C_4$)-alkoxy substituted hydrocarbon groups having from 1 to 6 carbon atoms excluding the alkoxy group carbon atoms,
$R^0$ is selected from the group consisting of saturated aliphatic hydroxyl-substituted hydrocarbon groups having 1 to 6 carbon atoms and 1 to 3 hydroxyl groups and ($C_1$–$C_4$)-alkoxy substituted hydrocarbon groups having from 1 to 6 carbon atoms excluding the alkoxy group carbon atoms,
X is selected from the group consisting of chlorine and bromine, and
Y is selected from the group consisting of silver and alkali metals.

19. A method comprising the step of polymerizing a compound of claim 1 in contact with a free radical initiator.

20. A method comprising the step of copolymerizing a compound of claim 1 with at least one other ethylenically unsaturated compound having an $H_2C{=}C{<}$ group in contact with a free radical initiator.

References Cited by the Examiner

UNITED STATES PATENTS 2,592,218  4/52  Weisgerber _____ 260—85.5

OTHER REFERENCES

Noller: Chemistry of Organic Compounds, published by W. B. Saunders Company, Philadelphia (1956), page 155.

LEON J. BERCOVITZ, *Primary Examiner.*

P. E. MANGAN, *Examiner.*

UNITED STATES PATENT OFFICE
CERTIFICATE OF CORRECTION

Patent No. 3,173,900　　　　　　　　　　　　　　　March 16, 1965

Elinor M. Hankins

It is hereby certified that error appears in the above numbered patent requiring correction and that the said Letters Patent should read as corrected below.

Column 13, lines 10 and 11, the formula should appear as shown below instead of as in the patent:

$$H_2C=C-(CH_2)_{n-1}H$$
$$|$$
$$COOH$$

Signed and sealed this 27th day of July 1965.

(SEAL)
Attest:

ERNEST W. SWIDER　　　　　　　　　　　　　　　EDWARD J. BRENNER
Attesting Officer　　　　　　　　　　　　　　　Commissioner of Patents